(12) United States Patent
Moreton

(10) Patent No.: US 6,738,062 B1
(45) Date of Patent: May 18, 2004

(54) DISPLACED SUBDIVISION SURFACE REPRESENTATION

(75) Inventor: Henry P. Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 317 days.

(21) Appl. No.: 09/839,422

(22) Filed: Apr. 20, 2001

Related U.S. Application Data

(60) Provisional application No. 60/261,017, filed on Jan. 10, 2001.

(51) Int. Cl.[7] .............................................. G06T 17/20
(52) U.S. Cl. ...................................... 345/423; 345/420
(58) Field of Search ................................. 345/419, 420, 345/423, 428, 442, 468, 473; 382/154

(56) References Cited

U.S. PATENT DOCUMENTS

| 6,046,744 A | * | 4/2000 | Hoppe | 345/419 |
| 6,108,006 A | * | 8/2000 | Hoppe | 345/423 |

OTHER PUBLICATIONS

Guskov et al., "Normal Meshes", SIGGRAPH 2000, p. 95.*
Parke et al., "Computer Facial Animation", A K Peters, Ltd., 1996, pp. 87–88.*
Cohen, Jonathan et al.; "Appearance–Preserving Simplification", University of North Carolina at Chapel Hill.
Taubin, Gabriel; "A Signal Processing Approach to Fair Surface Design", IBM T.J. Watson Research Center.
Cabral, Brian et al.; "Bidirectional Reflection Functions from Surface Bump Maps", UC Davis/Lawrence Livermore National Laboratory, Computer Graphics, vol. 21, No. 4, Jul. 1987.
Doo, D. et al.; "Behaviour of recursive division surfaces near extraordinary points", Brunel University, Uxbridge UK, IPC Business Press, 1978.
Kolarov, Krasimir et al; "Compression of Functions Defined on Surfaces of 3D Objects", Interveral Research Corporation, IEEE, 1997.
Blinn, James F.; "Simulation of Wrinkled Surfaces", Caltech/JPL, Computer Graphics, vol. 12, No. 3, Aug. 1978.
Mann, Stephen et al; "Cylindrical Surface Pasting" University of Waterloo, Jun. 1999.
Peercy, Mark et al.; "Efficient Bump Mapping Hardware", Silicon Graphics Computer Systems.
Shoham, Yair et al.; "Efficient Bit Allocation for an Arbitrary Set of Quantizers", IEEE, vol. 36, No. 9, Sep. 1988.
Zhang, Hansong et al.; "Fast Backface Culling Using Normal Masks", University of North Carolina at Chapel Hill, Symposium on Interactive 3D Graphics, 1997.
Krishnamurthy, Venkat et al.; "Fitting Smooth Surfaces to Dense Polygon Meshes", Stanford University.
Taubin, Gabriel et al.; "Geometric Compression Through Topological Surgery", ACM Transactions on Graphics, vol. 17, No. 2, Apr. 1998.
Deering, Michael, "Geometry Compression", Sun Microsystems.
Chan, Leith Kin Yip et al.; "World Space Surface Pasting", University of Waterloo, Graphics Interface 1997.
Certain, Andrew et al.; "Interactive Multiresolution Surface Viewing", University of Washington.

(List continued on next page.)

*Primary Examiner*—Mark Zimmerman
*Assistant Examiner*—Lance W. Sealey
(74) *Attorney, Agent, or Firm*—Silicon Valley IP Group, PC; Kevin J. Zilka

(57) ABSTRACT

A representation is provided for displacement mapping. Included are a coarse first mesh, and a fine second mesh with a topology substantially similar to a topology of the first mesh. The second mesh includes a plurality of scalar values which each represent an offset between various points on the first mesh and the second mesh.

13 Claims, 5 Drawing Sheets

OTHER PUBLICATIONS

Zorin, Denis; "Interactive Multiresolution Mesh Editing", Caltech and Bell Laboratories.

Peters, Jörg; "Local smooth surface interpolation: a classification", University of Wisconsin–Madison, Nov. 1989.

Kobbelt, Leif P. et al.; "Multiresolution Shape Deformations for Meshes with Dynamic Vertex Connectivity", Eurographics, vol. 19, No. 3, 2000.

Lee, Aaron W.F. et al.; "MAPS: Multiresolution Adaptive Parameterization of Sufaces".

Gumhold, Stefan et al.; "Multiresolution Rendering with Displacement Mapping", Surographics 1999.

Lounsbery, Michael; "Multiresolution Analysis for Surfaces of Arbitrary Topological Type", ACM Transactions on Graphics, vol. 16, No. 1, Jan. 1997.

Eck, Matthias; "Multiresolution Analysis of Arbitrary Meshes".

Taubman, David; "Multirate 3–D Subband Coding of Video", IEEE, vol. 3, No. 5, 1994.

Gottschalk, S. et al; "OBBTree: A Hierarchical Structure for Rapid Interference Detection", Computer Graphics Proceedings, Annual Conference Series, 1996.

Hoppe, Hugues; "Progressive Meshes", Microsoft Research.

Hoppe, Hugues; "Piecewise Smooth Surface Reconstruction", University of Washington.

Gumhold, Stefan; "Real Time Compression of Triangle Mesh Connectivity", WSI/GRIS University of Tübingen.

Catmull, E. et al; "Recursively generated B–spline surfaces on arbitrary topological meshes", Computer Graphics Laboratory.

Becker, Barry G. et al.; "Smooth Transitions between Bump Rendering Algorithms", University of California, Davis and Lawrence Livermore National Laboratory.

Schröder, Peter et al.; "Spherical Wavelets: Efficiently Representing Functions on the Sphere", University of South Carolina.

Loop, Charles Teorell; "Smooth Subdivision Surfaces Based on Triangles", The University of Utah, Aug. 1987.

Cook, Robert L.; "Shade Trees", Computer Graphics, vol. 18, No. 3, Jul. 1984.

DeRose, Tony et al.; "Subdivision Surfaces in Character Animation", Computer Graphics Proceedings, Annual Conference Series, 1998.

Garland, Michael et al.; "Surface Simplification Using Quadric Error Metrics", Carnegie Mellon University.

Carmo, Manfredo P.; "Differential Geometry of Curves and Surfaces" Prentice–Hall, Inc., Englewood Cliffs, New Jersey.

Forsey, David R. et al.; "Surface Fitting with Hierarchical Splines" ACM Transactions on Graphics, vol. 14, No. 2, Apr. 1995.

* cited by examiner

Original mesh displaced subvision surface initial control mesh

FIG. 4d optimized control mesh smooth domain surface displacement field

DISPLACED SUBDIVISION SURFACE REPRESENTATION

RELATED APPLICATION(S)

The present application claims priority of a provisional application filed Jan. 10, 2001 under Ser. No. 60/261,017.

FIELD OF THE INVENTION

The present invention relates to computer graphics, and more particularly to displacement mapping.

BACKGROUND OF THE INVENTION

Highly detailed surface models are becoming commonplace in the area of computer graphics, in part due to three-dimensional scanning technologies. Typically, these models are represented as dense triangle meshes. However, the irregularity and huge size of such meshes present challenges in manipulation, animation, rendering, transmission, and storage. FIG. 1 illustrates a surface 100 represented as dense triangle meshes.

Such surface 100 is an expensive representation because it stores:

(1) the irregular connectivity of faces,
(2) the (x,y,z) coordinates of the vertices,
(3) possibly several sets of texture parameterization coordinates (u,v) at the vertices, and
(4) texture images referenced by these parameterizations, such as color images and bump maps.

Examples of alternative representations will now be set forth that allow one to express a detailed surface as a displacement from a simpler, smooth domain surface.

A simple example of a displaced surface is terrain data expressed as a height field over a plane. The case of functions over the sphere has been considered in the past. See: Schröder, P., and Sweldens, W. Spherical wavelets: efficiently representing functions on the sphere. Proceedings of SIGGRAPH 95, Computer Graphics, Annual Conference Series, pp. 161–172. Another example is a three-dimensional scan of a human head expressed as a radial function over a cylinder. However, even for this simple case of a head, artifacts are usually detectable at the ear lobes, where the surface is not a single-valued function over the cylindrical domain.

It has been shown that a detailed model can be represented as a displacement map over a network of B-spline patches. See: Krishnamurthy, V., and Levoy, M. Fitting smooth surfaces to dense polygon meshes. Proceedings of SIGGRAPH 96, Computer Graphics, Annual Conference Series, pp. 313–324. However, such B-spline patches resort to a vector-valued displacement map because the detailed model is not always an offset of their B-spline surface. Also, avoiding surface artifacts during animation requires that the domain surface be tangent-plane ($C^1$) continuous, which involves constraints on the B-spline control points.

Many techniques have been developed in the past for modeling purposes. Such techniques involve subdivision surfaces, displacement maps, bump maps, and multiresolution subdivision.

Subdivision Surfaces

Subdivision schemes defining smooth surfaces have been introduced in much documentation. By way of example, reference may be made to:

1) Catmull, E., and Clark, J. Recursively generated B-spline surfaces on arbitrary topological meshes. Computer Aided Design 10, pp. 350–355 (1978);
2) Doo, D., and Sabin, M. Behavior of recursive division surfaces near extraordinary points. Computer Aided Design 10, pp. 356–360 (1978); and
3) Loop, C. Smooth subdivision surfaces based on triangles. Master's thesis, University of Utah, Department of Mathematics, 1987.

More recently, these schemes have been extended to allow surfaces with sharp features and fractionally sharp features. See:

1) DeRose, T., Kass, M., and Truong, T. Subdivision surfaces in character animation. Proceedings of SIGGRAPH 98, Computer Graphics, Annual Conference Series, pp. 85–94; and
2) Hoppe, H., DeRose, T., Duchamp, T., Halstead, M., Jin, H., McDonald, J., Schweitzer, J., and Stuetzle, W. Piecewise smooth surface reconstruction. Proceedings of SIGGRAPH 94, Computer Graphics, Annual Conference Series, pp. 295–302.

DeRose et al. define scalar fields over subdivision surfaces using subdivision masks. Hoppe et al. describe a method for approximating an original mesh with a much simpler subdivision surface. Such method does not, however, consider whether the approximation residual is expressible as a scalar displacement map.

Displacement Maps

The idea of displacing a surface by a function is set forth in Cook, R. Shade trees. Computer Graphics (Proceedings of SIGGRAPH 84), 18(3), pp. 223–231. Displacement maps have become popular commercially as procedural displacement shaders. The simplest displacement shaders interpolate values within an image, perhaps using standard bicubic filters. Though displacements may be in an arbitrary direction, they are almost always along the surface normal. See: Apodaca, A. and Gritz, L. Advanced RenderMan—Creating CGI for Motion Pictures, Morgan Kaufmann, San Francisco, Calif., 1999.

Typically, normals on the displaced surface are computed numerically using a dense tessellation. While simple, this approach requires adjacency information that may be unavailable or impractical with low-level APIs and in memory-constrained environments (e.g. game consoles). Strictly local evaluation requires that normals be computed from a continuous analytic surface representation. However, it is difficult to piece together multiple displacement maps while maintaining smoothness. One encounters the same vertex enclosure problem as in the stitching of B-spline surfaces. While there are well-documented solutions to this problem, they require constructions with many more coefficients (9×in the best case), and may involve solving a global system of equations. For more information on the vertex enclosure problem set forth hereinabove, reference may be made to: Peters, J. Local smooth surface interpolation: a classification. Computer Aided Geometric Design, 7(1990), pp. 191–195.

A scheme has also been developed for approximating an arbitrary mesh using a B-spline patch network together with a vector-valued displacement map. In such scheme, the patch network is constructed manually by drawing patch boundaries on the mesh. Additional work has been done on surface pasting using the idea of adding a vector-valued displacement map to a spline surface. For more information on such concepts, reference may be made to:

1) Chan, K., Mann, S., and Bartels, R. World space surface pasting. Graphics Interface '97, pp. 146–154;
2) Krishnamurthy, V., and Levoy, M. Fitting smooth surfaces to dense polygon meshes. Proceedings of SIGGRAPH 96, Computer Graphics, Annual Conference Series, pp. 313–324; and 3) Mann, S. and Yeung, T. Cylindrical surface pasting. Technical Report, Computer Science Dept., University of Waterloo (June 1999).

Hardware architecture has also been developed for rendering scalar-valued displacement maps over planar triangles. To avoid cracks between adjacent triangles of a mesh, the vertex normals may be interpolated across the triangle face, and the interpolated normal may be used to displace the surface. Such scheme permits adaptive tessellation in screen space. The importance of proper filtering when constructing mipmap levels in a displacement map should be recognized. The domain surface associated with the present technique is not smooth since it is a polyhedron. As such, animating a displaced surface using a polyhedral domain surface results in many surface artifacts. For more information on such hardware architecture, reference may be made to: Gumhold, S., and Hüttner, T. Multiresolution rendering with displacement mapping. SIGGRAPH workshop on Graphics hardware, Aug. 8–9, 1999.

An additional similar framework has been developed to express the geometry of one mesh as a displacement from another mesh, for the purpose of multiresolution shape deformation. For more information regarding such framework, reference may be made to: Kobbelt, L., Bareuther, T., and Seidel, H. P. Multi-resolution shape deformations for meshes with dynamic vertex connectivity. Proceedings of EUROGRAPHICS 2000.

With respect to displacement maps, there is a need for subdivision-based displacements that are inherently smooth. There is a further need for a surface representation that is more compact such that displaced surface normals may be computed more efficiently. Moreover, there is a need for unifying the representation around subdivision in order to simplify implementation and make operations such as magnification more natural.

Bump Maps

Bump maps have been introduced and developed in much documentation. For example, reference may be made to:

1) Blinn, J. F. Simulation of wrinkled surfaces. Proceedings of SIGGRAPH 78, Computer Graphics, pp. 286–292;

2) Cohen, J., Olano, M. and Manocha, D. Appearance preserving Simplification. Proceedings of SIGGRAPH 98, Computer Graphics, Annual Conference Series, pp. 115–122;

3) Peercy, M., Airey, J. and Cabral, B. Efficient bump mapping hardware. Proceedings of SIGGRAPH 97, Computer Graphics, Annual Conference Series, pp. 303–306;

4) Cabral, B., Max, N. and Springmeyer, R. Bidirectional reflection functions from surface bump maps. Proceedings of SIGGRAPH 87, Computer Graphics, Annual Conference Series, pp.273–281; and 5) Apodaca, A. and Gritz, L. Advanced RenderMan—Creating CGI for Motion Pictures, Morgan Kaufmann, San Francisco, Calif., 1999.

Blinn introduces the idea of perturbing the surface normal using a bump map. Peercy et al. present recent work on efficient hardware implementation of bump maps. Cohen et al. drastically simplify meshes by capturing detail in the related normal maps. Both Cabral et al. and Apodaca and Gritz discuss the close relationship of bump mapping and displacement mapping. Such documentation advocates combining them into a unified representation and resorting to true displacement mapping only when necessary.

Multiresolution Subdivision

Much documentation has been dedicated to the topic of multiresolution subdivision. For example, reference may be made to:

1) Lounsbery, M., DeRose, T., and Warren, J. Multiresolution analysis for surfaces of arbitrary topological type. ACM Transactions on Graphics, 16(1), pp. 34–73 (January 1997);

2) Zorin, D., Schröder, P., and Sweldens, W. Interactive multiresolution mesh editing. Proceedings of SIGGRAPH 97, Computer Graphics, Annual Conference Series, pp. 259–268;

3) Eck, M., DeRose, Tr., Duchamp, T., loppe, H., Lounsbery, M., and Stuetzle, W. Multiresolution analysis of arbitrary meshes. Proceedings of SIGGRAPH 95, Computer Graphics, Annual Conference Series, pp. 173–182;

4) Lee, A., Sweldens, W., Schröder, P., Cowsar, L., and Dobkin, D. MAPS: Multiresolution adaptive parameterization of surfaces. Proceedings of SIGGRAPH 98, Computer Graphics, Annual Conference Scries, pp. 95–104; and 5) Guskov, I., Vidimce, K., Sweldens, W., and Schröder, P. Normal meshes. Proceedings of SIGGRAPH 2000, Computer Graphics, Annual Conference Series.

Lounsbery et al. apply multiresolution analysis to arbitrary surfaces. Given a parameterization of the surface over a triangular domain, they compress this (vector-valued) parameterization using a wavelet basis, where the basis functions are defined using subdivision of the triangular domain. Zorin et al. use a similar subdivision framework for multiresolution mesh editing. To make this multiresolution framework practical, several techniques have been developed for constructing a parameterization of an arbitrary surface over a triangular base domain. Eck et al. use Voronoi/Delaunay diagrams and harmonic maps, while Lee et al. track successive mappings during mesh simplification.

Guskov et al. represent a surface by successively applying a hierarchy of displacements to a mesh as it is subdivided. Their construction allows most of the vertices to be encoded using scalar displacements, but a small fraction of the vertices require vector displacements to prevent surface folding.

Regarding multiresolution subdivision, there is a need for a technique that does not support an arbitrary parameterization of the surface, and thus need only compress a scalar-valued function instead of vector-valued parameterization. In other words, there is a need for a process that only requires the storage of geometric detail, not parameterization data.

DISCLOSURE OF THE INVENTION

A representation is provided for displacement mapping. Included are a coarse first mesh, and a fine second mesh with a topology substantially similar to a topology of the first mesh. The second mesh includes a plurality of scalar values which each represent an offset between various points on the first mesh and the second mesh.

BRIEF DESCRIPTION OF THE DRAWINGS

The foregoing and other aspects and advantages are better understood from the following detailed description of a preferred embodiment of the invention with reference to the drawings, in which:

FIGS. 4a–f illustrate the various meshes, surfaces and fields associated with one embodiment of the present invention;

FIG. 4g illustrates a method for modified displacement mapping to convert an arbitrary triangle mesh into a displaced subdivision surface;

DESCRIPTION OF THE PREFERRED EMBODIMENTS

Figure 1:
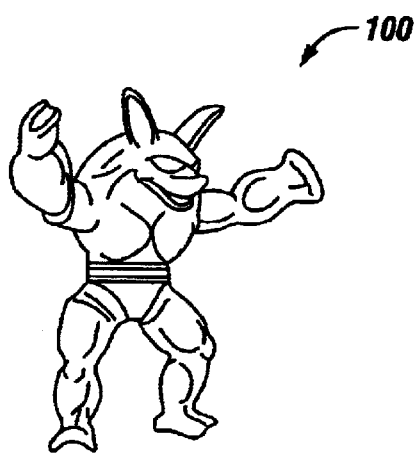
FIG. 1 illustrates a surface represented as dense triangle meshes in accordance with the prior art.
Figure 2:
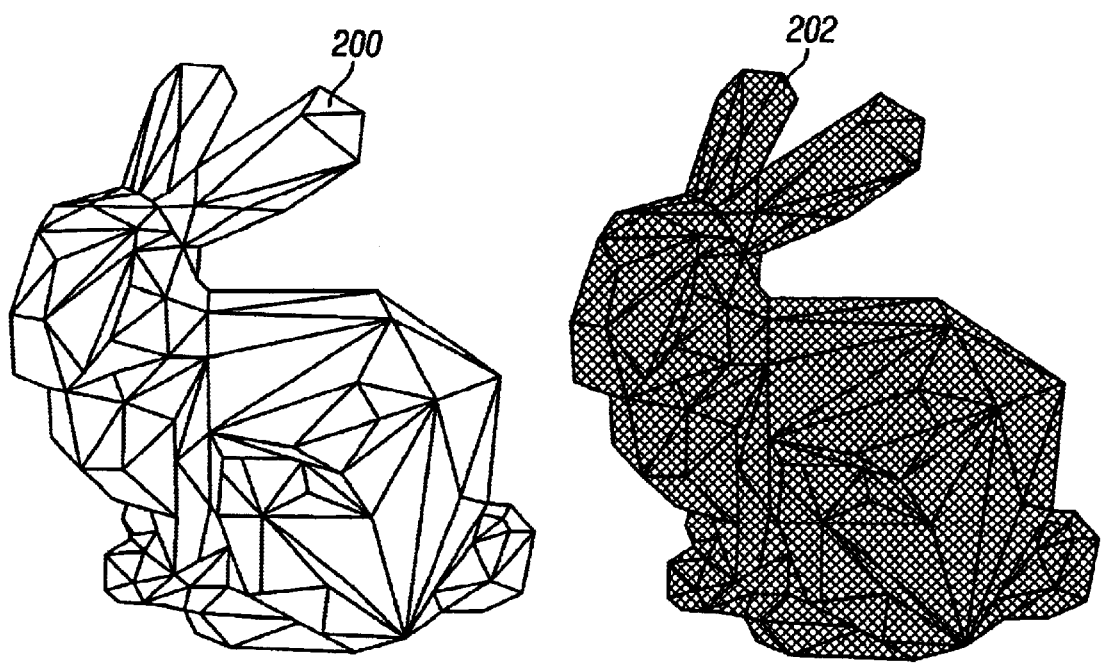
FIG. 2 is an illustration of the two types of meshes that make up the displaced subdivision surface of one embodiment of the present invention.

FIG. 2 is an illustration of the two types of meshes that make up the displaced subdivision surface of the present invention. The displaced subdivision surface of the present invention includes a triangle control mesh 200 and a scalar displacement mesh 202 of scalar displacement coefficients. In the context of the present invention, a mesh may be any set of vertices, edges and/or faces that form a 2-manifold surface. That is, the edges may be shared by two faces or less. In the case of a closed surface, edges may separate two faces, and the faces may have any number of sides. Such type of surface obeys the Euler relation which identifies the relative numbers of vertices, edges, and faces, given the genus of the surface. It should be noted that the faces of the mesh need not be planar.

Further included is a domain surface that is generated from the control mesh 200 using any one of many subdivision surface schemes that are curvature continuous at all but a finite number of locations (e.g. extraordinary points). In the context of the present invention, a domain surface is defined as a combination of the control mesh and a subdivision scheme. The domain surface is the limit surface resulting from applying a subdivision scheme to a control mesh. Likewise, the displacements applied to the domain surface are generated from the scalar displacement mesh 202 using similar subdivision surface schemes.

In one embodiment, a Loop subdivision surface scheme or Catmull-Clark scheme may be employed. It should be noted that the present invention is not limited to Loop triangles, which correspond to quartic total degree, and is further not limited to the Catmull-Clark scheme, which corresponds to bicubic patches. The principles set forth herein may be utilized in the context of any desired scheme.

It should be understood that some subdivision schemes are not well defined for all input meshes. Loop is only defined for meshes composed of triangles (3-sided faces) while Catmull-Clark is well-defined for faces of any number of sides. Additional information regarding the foregoing exemplary schemes may be found with reference to:

1) Loop, C. Smooth subdivision surfaces based on triangles. Master's thesis, University of Utah, Department of Mathematics, 1987; and
2) Catmull, E., and Clark, J. Recursively generated B-spline surfaces on arbitrary topological meshes. Computer Aided Design 10, pp. 350–355 (1978).

which are each incorporated herein by reference in their entirety. Additional information regarding various aspects, i.e. displacement maps, normal calculations, bump maps, and other textures, of the present invention will now be described.

Displacement Map

The scalar displacement mesh 202 is stored for each triangle of the triangle control mesh 200 as one half of a sample grid $(2^k+1)*(2^k+1)$, where k depends on the sampling density required to achieve a desired level of accuracy or compression. To define a continuous displacement function, these stored values are taken to be subdivision coefficients for the same subdivision scheme that defines the domain surface.

Thus, as the surface is magnified (i.e. subdivided beyond level k), both the domain surface geometry and the displacement field are subdivided using the same machinery. As a consequence, the displacement field is $C^1$ even at extraordinary vertices, and the displaced subdivision surface is $C^1$ everywhere except at extraordinary vertices. The handling of extraordinary vertices is discussed below.

For surface minification, the limit displacements for the subdivision coefficients at level k are first computed. Thereafter, a mipmap pyramid is computed with levels $\{0, \ldots k-1\}$ by successive filtering of these limit values. In one embodiment, such filtering may be as simple as subsampling without any "real" filtering. Additional information regarding these filtering possibilities will be set forth hereinbelow in the section labeled "Filtering of Displacement Map". As with ordinary texture maps, the content author may sometimes want more precise control of the filtered levels, so it may be useful to store the entire pyramid.

For many input meshes, it is inefficient to use the same value of k for all control mesh faces. For a given face, the choice of k may be guided by the number of original triangles associated it. Such number may be calculated using any well known method. For example, one method that may be used is set forth in: Lee, A., Sweldens, W., Schröder, P., Cowsar, L., and Dobkin, D. MAPS: Multiresolution adaptive parameterization of surfaces. Proceedings of SIGGRAPH 98, Computer Graphics, Annual Conference Series, pp. 95–104, which is incorporated herein by reference in its entirety. Those regions with lower values of k are further subdivided to produce a mesh with uniform k.

Normal Calculation

Figure 3:
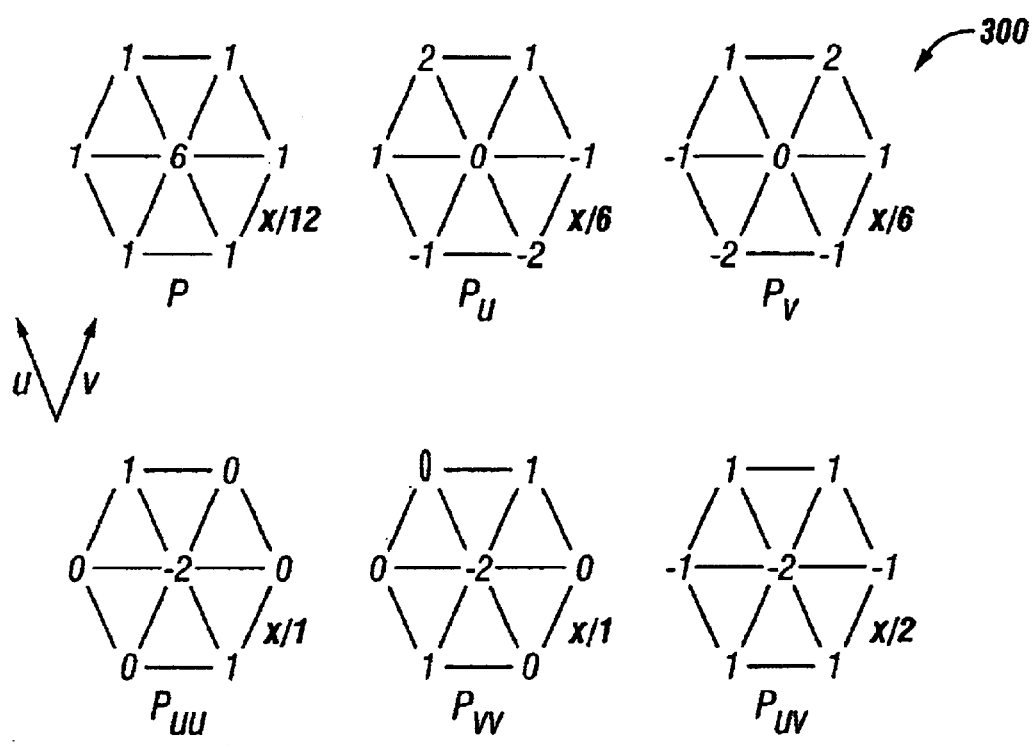
FIG. 3 illustrates loop masks for limit position P and first and second derivatives at a regular control vertex.

Next, a surface normal is calculated for a point S on the displaced subdivision surface. FIG. 3 illustrates loop masks 300 for limit position P and first and second derivatives at a regular control vertex. Let S be the displacement of the limit point P on the domain surface:

$$S=P+D*n'$$

where D is the limit displacement and $n'=n/\|n\|$ is the unit normal on the domain surface. The normal n is obtained as $n = P_u \times P_v$, where the tangent vectors $P_u$ and $P_v$ are computed using the first derivative masks.

The displaced subdivision surface normal at S is defined as $n_s = S_u \times S_v$, where each tangent vector has the form:

$$S_u = P_u + D_u n' + D^* n'_u$$

If the displacements are relatively small, it is common to ignore the third term, which contains second-order derivatives. For more information on this technique, reference may be made to: Blinn, J. F. Simulation of wrinkled surfaces. Proceedings of SIGGRAPH 78, Computer Graphics, pp. 286–292, which is incorporated by reference in its entirety. However, if the surface is used as a modeling primitive, then the displacements may be quite large and the full expression must be evaluated. The difficult term $n_u' = n_u / \|n_u\|$ may be derived using the Weingarten equations. More information on Weingarten equations may be found in: Do Carmo, M. P. Differential Geometry of Curves and Surfaces. Prentice-Hall, Inc., Englewood Cliffs, N.J., 1976, which is incorporated herein by reference in its entirety. Equivalently, it may be expressed as:

$$n'_u = [n_u - n'(n_u \cdot n')] / \|n\|, \text{ where } n_u = P_{uu} \times P_v + P_u \times P_{uv}.$$

As shown in FIG. 3, a simple set of masks give the necessary partial derivatives at a regular (valence 6) vertex. At extraordinary vertices, the curvature of the domain surface vanishes and the second-order term is omitted. In this case, the standard Loop tangent masks may be used to compute the first partial derivatives. Since there are few extraordinary vertices, this simplified normal calculation may be acceptable.

Bump Map

The displacement map may also be used to generate a bump map during the rendering of coarser tessellations. This improves rendering performance on graphics systems where geometry processing is a bottleneck. The construction of this bump map is set forth later in the section labeled "Scalability."

Other Textures

The domain surface parameterization is used for storing the displacement map (which also serves to define a bump map). It is natural to re-use this same inherent parameterization to store additional appearance attributes for the surface, such as color. In a later section labeled "Resampling of Appearance Attributes", it is set forth how such attributes are re-sampled from the original surface.

Alternatively, one could define more traditional surface parameterizations by explicitly specifying (u,v) texture coordinates at the vertices of the control mesh, as set forth in DeRose, T., Kass, M., and Truong, T. Subdivision surfaces in character animation. Proceedings of SIGGRAPH 98, Computer Graphics, Annual Conference Series, pp. 85–94, which is incorporated herein by reference in its entirety.

However, since the domain of a (u,v) parameterization is a planar region, this generally requires segmenting the surface into a set of charts. With the representation now described, the process by which an arbitrary triangle mesh is converted into a displaced subdivision surface will now be set forth.

Conversion Process

FIGS. 4a–f illustrate the various meshes, surfaces and fields associated with one embodiment of the present invention. FIG. 4g illustrates a method 450 for modified displacement mapping to convert an arbitrary triangle mesh 400 (See FIG. 4a) into a displaced subdivision surface 402 (See FIG. 4b). Initially, in operation 452, the original first mesh 400 is obtained.

Figure 4A:
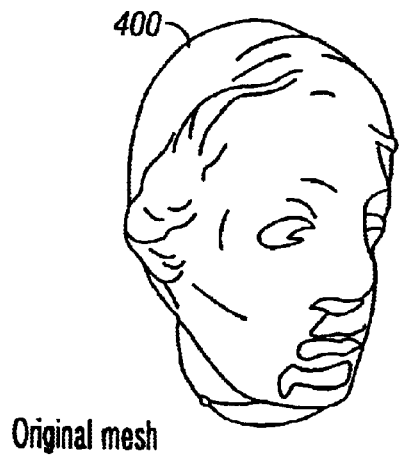
Figure 4B:
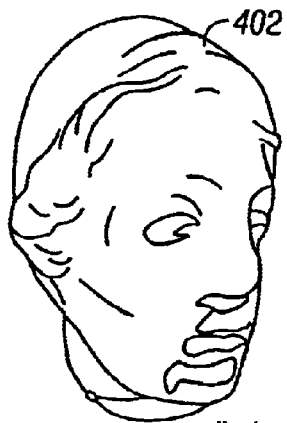
Figure 4C:
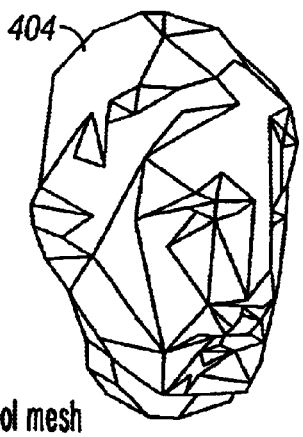

Thereafter, in operation 454, the original first mesh 400 is simplified for the purpose of generating a second mesh, i.e. initial control mesh, 404 (See FIG. 4c). Simplification may be accomplished using a traditional sequence of edge collapse transformations, but with added heuristics to attempt to preserve a scalar offset function. It should be noted, however, that any desired simplification method may be utilized for the purpose of generating the second mesh 404. More information regarding the simplification process will be set forth later in the section labeled "Simplification to Control Mesh."

Figure 4E:
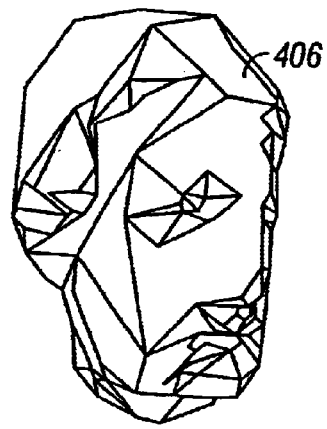
Figure 4E:
Figure 4F:
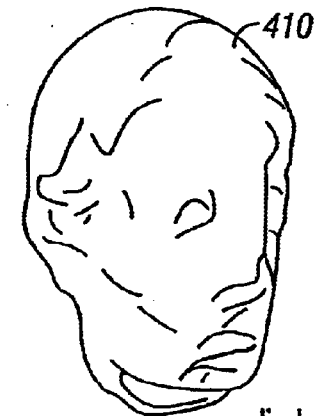

Such second mesh 404 is then optimized (see 406 in FIG. 4d) in order to generate a domain surface 408 (See FIG. 4e). The vertices of the second mesh 404 are optimized such that the domain surface 408 more accurately fits the original mesh 400. See operation 456. Additional information regarding the optimization process will be set forth later in the section labeled "Optimization of the Domain Surface." It should be understood that any desired optimization method may be utilized for ensuring that the domain surface 408 more accurately fits the original mesh 400.

Intersections are then generated between normals formed on the domain surface 408 and the original first mesh 400 for sampling purposes, as indicated in operation 458. The resulting displacement map 410 (See FIG. 4f) is sampled by shooting rays along the domain surface normals until they intersect the original mesh 400. At the ray intersection points, the signed displacement may be computed, and optionally sample other appearance attributes like surface color. (The black line segments visible in FIG. 4f correspond to rays with positive displacements.) More information regarding the sampling process will be set forth later in the section labeled "Sampling of Scalar Displacement Map."

Simplification to Control Mesh (Operation 454)

Additional information regarding operation 454 of FIG. 4g will now be set forth. The original mesh 400 may be simplified using a sequence of edge collapse transformations prioritized according to the quadric error metric of Garland and Heckbert. In order to produce a good domain surface 408, some of the candidate edge collapses may be restricted. For more information on edge collapse transformations and the quadric error metric of Garland and Heckbert, reference may be made to:

1) Hoppe, H. Progressive meshes. Proceedings of SIGGRAPH 96, Computer Graphics, Annual Conference Series, pp. 99–108; and
2) Garland, M., and Heckbert, P. Surface simplification using quadric error metrics. Proceedings of SIGGRAPH 97, Computer Graphics, Annual Conference Series, pp. 209–216;

which are incorporated herein by reference in their entirety.

One objective is that the resulting domain surface 408 should be able to express the original mesh 400 using a scalar displacement map. One approach is to ensure that the space of normals on the domain surface 408 remains locally similar to the corresponding space of normals on the original mesh 400.

To maintain an efficient correspondence between the original mesh 400 and the simplified control mesh 404, the MAPS scheme may be used to track parameterizations of all original vertices on the mesh simplified so far. For more information regarding the MAPS scheme, reference may be made to Lee, A., Sweldens, W., Schröder, P., Cowsar, L., and Dobkin, D. MAPS: Multiresolution adaptive parameterization of surfaces. Proceedings of SIGGRAPH 98, Computer Graphics, Annual Conference Series, pp. 95–104, which is incorporated herein by reference in its entirety.

When an edge is collapsed, the parametrizations of points in the neighborhood are updated using a local 1-to-1 map onto the resulting neighborhood. For each candidate edge collapse transformation, the mesh neighborhood that would result is examined.

Figure 5:
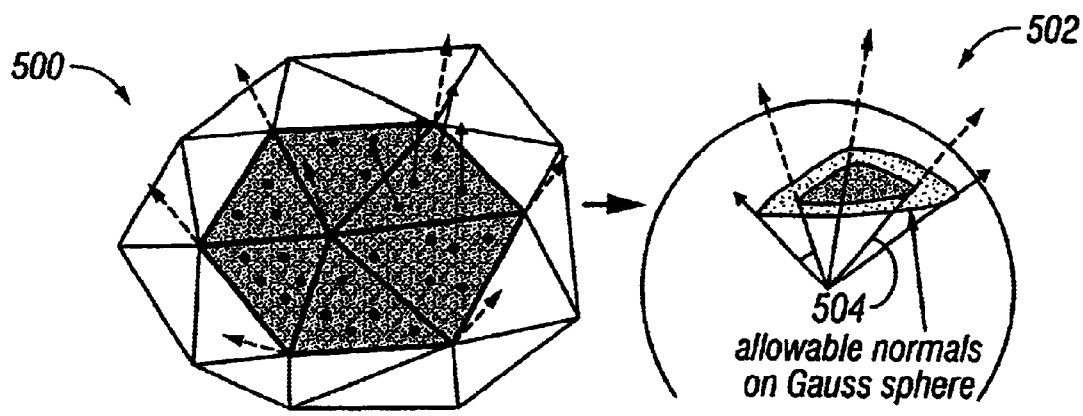
FIG. 5 illustrates a neighborhood after a candidate edge collapse operation and, for one face, the spherical triangle about its domain surface normals in accordance with the simplification operation of FIG. 4g.

FIG. 5 illustrates the neighborhood 500 after candidate edge collapse and, for one face, the spherical triangle 502 about its domain surface normals 504. As shown in FIG. 5, the thickened 1-ring is the neighborhood 500 of the unified vertex. For vertices on this ring, the subdivision surface normals 504 are computed using tangent masks that involve vertices in the 2-ring of the unified vertex. The highlighted points within the faces in the 1-ring represent original mesh vertices that are currently parameterized on the neighborhood 500 using MAPS.

For each face in the 1-ring neighborhood 500, the 3 subdivision surface normals at the vertices are gathered and form their spherical triangle on the Gauss sphere. Then, it is tested whether this spherical triangle encloses the normals of the original mesh vertices parameterized using MAPS. If this test fails on any face in the 1-ring, the edge collapse transformation is disallowed. To allow simplification to proceed further, it may be useful to broaden each spherical triangle by pushing its three vertices an additional 45 degrees away from its inscribed center, as illustrated in FIG. 5.

The domain surface sometimes may have undesirable undulations when the control mesh has vertices of high valence. Therefore, during simplification, an edge collapse may be disallowed if the resulting unified vertex would have valence greater than 8.

Optimization of Domain Surface (Operation 456)

Additional information regarding operation 456 of FIG. 4g will now be set forth. Having formed the initial control mesh 404 of FIG. 4c, the locations of its vertices are optimized such that the associated subdivision surface 402 more accurately fits the original mesh 400. This step may be performed using any desired well known method. For example, one method that may be used is set forth in Hoppe, H., DeRose, T., Duchamp, T., Halstead, M., Jin, H., McDonald, J., Schweitzer, J., and Stuetzle, W. Piecewise smooth surface reconstruction. Proceedings of SIGGRAPH 94, Computer Graphics, Annual Conference Series, pp. 295–302, which is incorporated herein by reference in its entirety.

A dense set of points are sampled from the original mesh 400. Further, their squared distances to the subdivision surface 402 are minimized. This nonlinear optimization problem is approximated by iteratively projecting the points onto the surface and solving for the most accurate surface while fixing those parameterizations. The result of this step is shown in FIGS. 4d–e.

It should be noted that this geometric optimization modifies the control mesh 404 and thus affects the space of normals over the domain surface 408. Although this invalidates the heuristic used to guide the simplification process, this does not necessarily cause a problem. In another embodiment, the subdivision surface 402 may be optimized for each candidate edge collapse prior to testing the neighborhood normals, but this would be much more costly.

Sampling of Scalar Displacement Map (Operation 458)

Additional information regarding operation 458 of FIG. 4g will now be set forth. In one embodiment, k steps of loop subdivision may be applied to the control mesh 404. At each of these subdivided vertices, the limit position and normal of the domain surface 408 may be computed. It is sought to compute the signed distance from the limit point to the original surface 400 along the normal (see FIG. 4f).

The directed line formed by the point and normal is intersected with the original surface 400, using a spatial hierarchy for efficiency. For more information regarding such spatial hierarchy, reference may be made to Gottschalk, S., Lin, M., and Manocha, D. OBB-tree: a hierarchical structure for rapid interference detection. Proceedings of SIGGRAPH 96, Computer Graphics, Annual Conference Series, pp. 171–180, which is incorporated herein by reference in its entirety.

Figure 6:
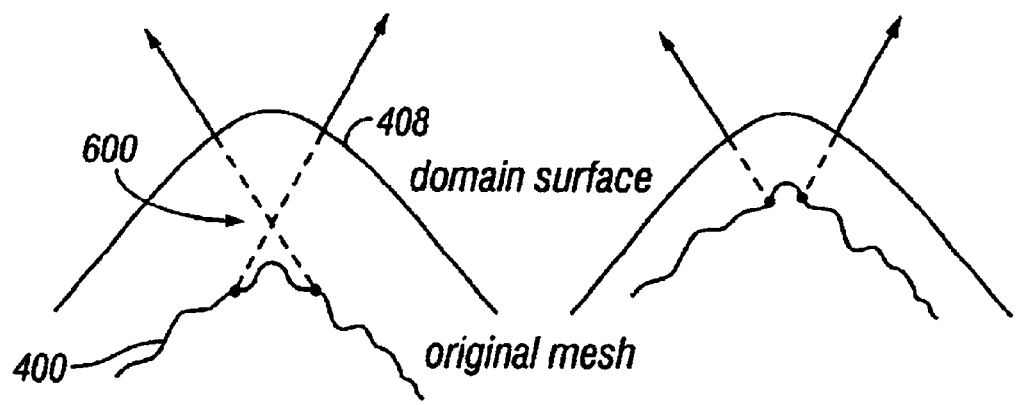
FIG. 6 illustrates a possible failure case if the domain surface is too far from the original mesh during the sampling operation of FIG. 4g.

An intersection point is disregarded if the intersected surface is oriented in the wrong direction with respect to the directed line. If multiple intersection points remain, the one closest to the domain surface 408 is picked. FIG. 6 illustrates a possible failure case if the domain surface 408 is too far from the original mesh 400. As shown, the displacement sampling may "fold over itself" 600 if the domain surface 408 is too distant from the original mesh 400.

Near surface boundaries, there is the problem that the domain surface 408 may extend beyond the boundary of the original mesh 400, in which case the ray does not intersect any useful part of the original surface. This may be detected using a maximum distance threshold based on the mesh size. In this case, the surface may be left undefined, i.e. trimmed to the detailed boundary of the original mesh 400. One approach is to store a special illegal value into the displacement map. In the alternative, the closest original triangle to the subdivided vertex may be found, and the ray may be intersected with the plane containing that triangle. Precise surface trimming can be achieved using an alpha mask in the surface color image.

Resampling of Appearance Attributes

Besides sampling the scalar displacement function, one may also sample other appearance attributes such as diffuse color. These attributes are stored, filtered, and compressed just like the scalar displacements.

Filtering of Displacement Map

Since the displacement field has the same structure as the domain surface 408, one can apply the same subdivision mask for magnification. This is particular useful when attempting to zoom in a tiny region on our displaced subdivision surface. For sampling the displacements at minified levels of the displacement pyramid, the samples may be computed at any level 1<k by filtering the limit displacements of level 1+1. While several filtering operations may be considered, one feasible non-shrinking filter is disclosed in Taubin, G. A signal processing approach to fair surface design. Proceedings of SIGGRAPH 95, Computer Graphics, Annual Conference Series, pp. 351–358, which is incorporated herein by reference in its entirety.

Because the displacement magnitudes are kept small, their filtering is not extremely sensitive. In many rendering situations much of the visual detail is provided by bump mapping.

Conversion Results

Table 1 shows execution times for the various steps of the conversion process. These times are obtained on a Pentium III 550 MHz PC.

TABLE 1

| Model | armadillo | venus | bunny | dinosaur |
|---|---|---|---|---|
| Conversion Statistics | | | | |
| Original mesh #F | 210,944 | 100,000 | 69,451 | 342,138 |
| Control mesh #F | 1,306 | 748 | 526 | 1,564 |
| Maximum level k | 4 | 4 | 4 | 4 |
| Execution Times (minutes) | | | | |
| Simplification | 61 | 28 | 19 | 115 |
| Domain surface optimize. | 25 | 11 | 11 | 43 |
| Displacement sampling | 2 | 2 | 1 | 5 |
| Total | 88 | 41 | 31 | 163 |

Benefits

Compression

Mesh compression has recently been an active area of research. Several clever schemes have been developed to concisely encode the combinatorial structure of the mesh connectivity, in as few as 1–2 bits per face. Note the following documents:

1) Taubin, G. A signal processing approach to fair surface design. Proceedings of SIGGRAPH 95, Computer Graphics, Annual Conference Series, pp. 351–358.
2) Gumhold, S., and StraBer, W. Real time compression of triangle mesh connectivity. Proceedings of SIG-GRAPH 98, Computer Graphics, Annual Conference Series, pp. 133–140;

which are incorporated herein by reference in their entirety.

As a result, the major portion of a compressed mesh goes to storing the mesh geometry. Vertex positions are typically compressed using quantization, local prediction, and variable-length delta encoding. Geometry can also be compressed within a multiresolution subdivision framework as a set of wavelet coefficients. See Lounsbery, M., DeRose, T., and Warren, J. Multiresolution analysis for surfaces of arbitrary topological type. ACM Transactions on Graphics, 16(1), pp. $^3$4–73 (January 1997) which is incorporated herein by reference in its entirety. All previous compression schemes for arbitrary surfaces treat geometry as a vector-valued function.

In contrast, displaced subdivision surfaces allow fine geometric detail to be compressed as a scalar-valued function. Moreover, the domain surface is constructed to be close to the original surface, so the magnitude of the displacements tends to be small.

To exploit spatial coherence in the scalar displacement map, linear prediction may be used at each level of the displacement pyramid, and the difference between the predicted and actual values may be encoded. For each level, the difference coefficients over all faces may be treated as a subband. For each subband, the embedded quantizer and embedded entropy coder may be used which are described in Taubman, D. and Zakhor, A. Multirate 3-D subband coding of video. IEEE Transactions on Image Processing, Vol. 3, No. 5, September 1994, which is incorporated herein by reference in its entirety. The subbands may be merged using the bit allocation algorithm which is based on integer programming, and which is described in Shoham, Y. and Gersho, A. Efficient bit allocation for an arbitrary set of quantizers. IEEE Transactions on Acoustics, Speech, and Signal Processing, Vol. 36, No. 9, pp. 1445–1453, September 1988, which is incorporated herein by reference in its entirety.

An alternative would be to use the compression scheme described in Kolarov, K. and Lynch, W. Compression of functions defined on surfaces of 3D objects. In J. Storer and M. Cohn, editors, Proc. Of Data Compression Conference, IEEE, pp. 281–291, 1997, which is incorporated herein by reference in its entirety. This scheme is a generalization of the wavelet compression method set forth in Schröder, P., and Sweldens, W. Spherical wavelets: efficiently representing functions on the sphere. Proceedings of SIGGRAPH 95, Computer Graphics, Annual Conference Series, pp. 161–172, which is incorporated herein by reference in its entirety.

The simplified meshes may be obtained using the scheme set forth in Garland, M., and Heckbert, P. Surface simplification using quadric error metrics. Proceedings of SIG-GRAPH 97, Computer Graphics, Annual Conference Series, pp. 209–216, which is incorporated herein by reference in its entirety. For mesh compression, the VRML compressed binary format may be used that is set forth in Taubin, G. and Rossignac, J. Geometric compression through topological surgery. ACM Transactions on Graphics, 17(2), pp. 84–115 (April 1998), which is incorporated herein by reference in its entirety.

In one embodiment, the quantization level for the vertex coordinates is varied to obtain different compressed meshes, and then the displacement map compression parameters are adjusted to obtain a displaced surface with matching L 2 geometric error. Compression results would likely be improved further by adapting the quantization of the control mesh as well. However, this would modify the domain surface geometry, and would therefore require re-computing the displacement field. Also, severe quantization of the control mesh would result in larger displacement magnitudes.

Editing

The fine detail in the scalar displacement mesh can be edited conveniently. For example, an embossing effect may produced by enhancing the scalar displacements according to a texture image projected onto the displaced surface.

Animation

Figure 7:
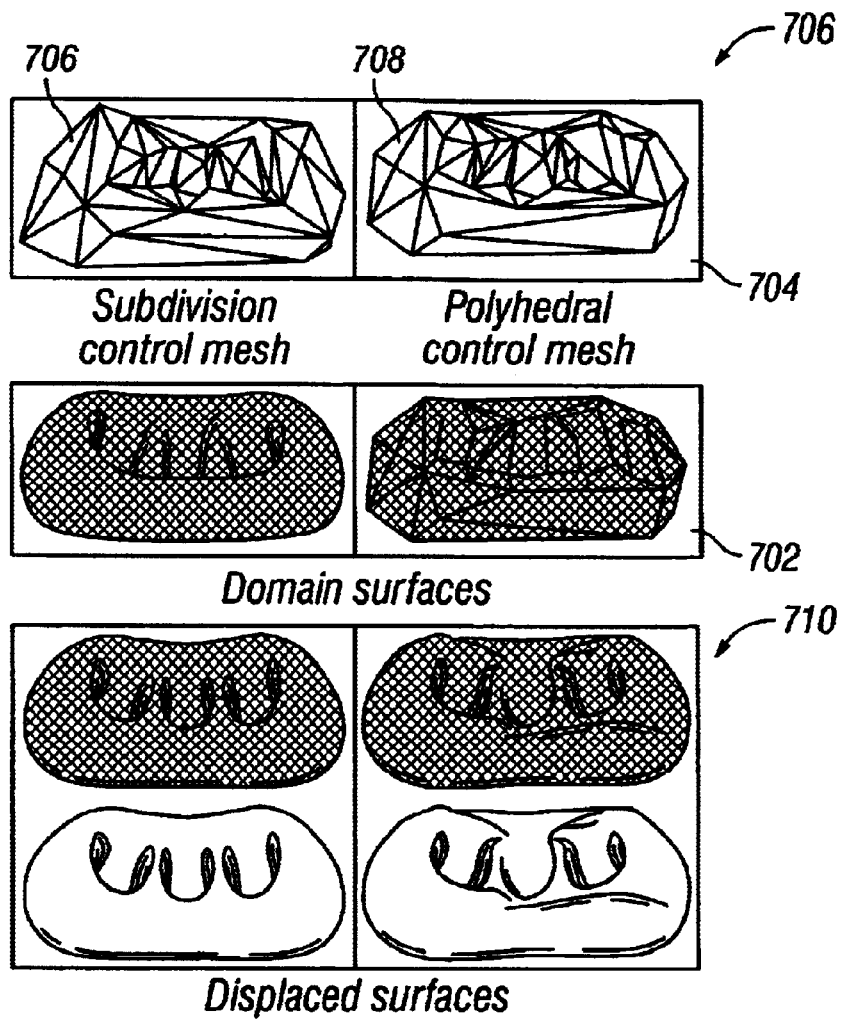
FIG. 7 illustrates a comparison showing the importance of using a smooth domain surface when deforming the control mesh.

FIG. 7 illustrates a comparison 700 showing the importance of using a smooth domain surface 702 when deforming the control mesh 704. The domain surface 702 is a subdivision surface 706 on the left, and a polyhedron surface 708 on the right. Displaced subdivision surfaces 710 are a convenient representation for animation. Kinematic and dynamics computation are vastly more efficient when operating on the control mesh rather than the huge detailed mesh. Because the domain surface is smooth, the surface detail deforms naturally without artifacts. FIG. 7 shows that in contrast, the use of a polyhedron as a domain surface results in creases and folds even with a small deformation of a simple surface.

Another application of our representation is the fitting of 3D head scans. See Marschner, S., Guenter, B., and Raghupathy, S. Modeling and rendering for realistic facial animation. Submitted for publication, which is incorporated herein by reference in its entirety. For this application, it is desirable to re-use a common control mesh structure so that deformations can be conveniently transferred from one face model to another.

Scalability

Depending on the level-of-detail requirements and hardware capabilities, the scalar displacement function can either be:

rendered as explicit geometry: Since it is a continuous representation, the tessellation is not limited to the resolution of the displacement mesh. A scheme for adaptive tessellation is presented in a later section labeled "Rendering."

converted to a bump map: This improves rendering performance on graphics systems where geometry processing is a bottleneck. The calculation necessary for tangent-space bump mapping involves computing the displaced subdivision surface normal relative to a coordinate frame on the domain surface. See: Peercy, M., Airey, J. and Cabral, B. Efficient bump mapping hardware. Proceedings of SIGGRAPH 97, Computer Graphics, Annual Conference Series, pp. 303–306, which is incorporated herein by reference in its entirety.

A convenient coordinate frame is formed by the domain surface unit n' and a tangent vector such as $P_u$. Given these vectors, the coordinate frame is:

$$\{b',t',n'\} \text{ where } t'=P_u/\|P_u\| \text{ and } b'=n'\times t'$$

Finally, the normal $n'_s$ to the displaced subdivision surface relative to this tangent space is computed using the transform:

$$n'_{tangent\ space}=\{b',t',n'\}T\cdot n'_s$$

It should be noted that the computations of n', $P_u$, and $n'_s$ were already described hereinabove. The precise analytic normal is preferably used in the bump map calculation.

Rendering

Adaptive Tessellation

Figure 8:
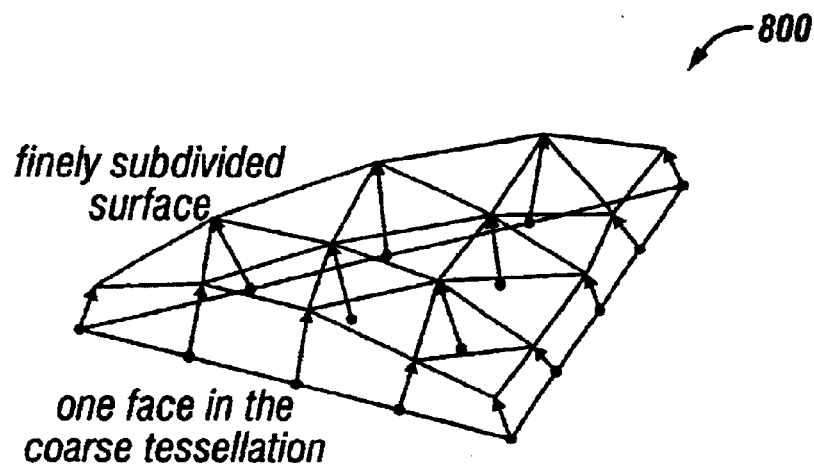
FIG. 8 illustrates an error computation for adaptive tessellation.

In order to perform adaptive tessellation, the approximation error of any intermediate tessellation level may have to be computed from the finely subdivided surface. This approximation error is obtained by computing the maximum distance between the dyadic points on the planar intermediate level and their corresponding surface points at the finest level. FIG. 8 illustrates the error computation 800 for adaptive tessellation. As shown, the error measurement corresponds to parametric error and is stricter than geometric error. Bounding parametric error is useful for preventing appearance fields (e.g. bump map, color map) from sliding over the rendered surface. See: Cohen, J., Olano, M. and Manocha, D. Appearance preserving Simplification. Proceedings of SIGGRAPH 98, Computer Graphics, Annual Conference Series, pp. 115–122, which is incorporated herein by reference in its entirety.

These precomputed error measurements are stored in a quadtree data structure. At runtime, adaptive tessellation prunes off the entire subtree beneath a node if its error measurement satisfies given level-of-detail parameters. By default, the displacements applied to the vertices of a face are taken from the corresponding level of the displacement pyramid.

It should be noted that the pruning makes adjacent subtrees meet at different levels. To avoid cracks, if a vertex is shared among different levels, the finest one is chosen from the pyramid. Also, a retriangulation of the coarser face is performed so that it conforms to the vertices along the common edges.

Backface Patch Culling

To improve rendering performance, regions of the displaced subdivision surface that are entirely facing away from the viewpoint are not rendered. This is achieved using the normal masks technique set forth in Zhang, H., and Hoff, K. Fast backface culling using normal masks. Symposium on Interactive 3D Graphics, pp. 103–106, 1997, which is incorporated herein by reference in its entirety.

On the finely subdivided version of the domain surface, the vertex normals of the displaced surface are computed in the manner set forth earlier. These are then converted into a normal mask for each subdivided face. During a bottom-up traversal of the subdivision hierarchy, these masks are propagated to the parents using the logical or operation.

Given the view parameters, a viewing mask is constructed as set forth in the Zhang documentation. One may then take its logical and with the stored masks in the hierarchy. Generally, ⅓ to ¼ of the total number of triangles may be culled, thereby speeding up rendering time by 20% to 30%.

Remeshinf Creases

As in other remeshing methods, the presence of creases in the original surface presents challenges to the conversion process of the present invention. The key is to associate such creases with edges in the control mesh. See: Lee, A., Sweldens, W., Schröder, P., Cowsar, L., and Dobkin, D. MAPS: Multiresolution adaptive parameterization of surfaces. Proceedings of SIGGRAPH 98, Computer Graphics, Annual Conference Series, pp. 95–104, which is incorporated herein by reference in its entirety. The simplification process of the present invention achieves this since mesh simplification naturally preserves sharp features.

However, displaced subdivision surfaces have the further constraint that the displacements are strictly scalar. Therefore, the edges of the control mesh, when subdivided and displaced, do not generally follow original surface creases exactly. (A similar problem also arises at surface boundaries.) This problem can be resolved if displacements were instead vector-based, but then the representation would lose its simplicity and many of its benefits (compactness, ease of scalability, etc.).

Scaling of Displacements

Currently, scalar displacements are simply multiplied by unit normals on the domain surface. With a "rubbery" surface, the displaced subdivision surface behaves as one would expect, since detail tends to smooth as the surface stretches. However, greater control over the magnitude of displacement is desirable in many situations. A simple extension of the current representation is to provide scale and bias factors (s, b) at control mesh vertices. These added controls enhance the basic displacement formula:

$$S=P(sD+b)^*n'$$

Alternate Embodiments

Nearly all geometric representations capture geometric detail as a vector-valued function. It has been shown that an arbitrary surface can be approximated by a displaced subdivision surface, in which geometric detail is encoded as a scalar-valued function over a domain surface. The representation of the present invention defines both the domain surface and the displacement function using a unified subdivision framework. This synergy allows simple and efficient evaluation of analytic surface properties.

It has been demonstrated that the representation offers significant savings in storage compared to traditional mesh compression schemes. It is also convenient for animation, editing, and runtime level-of-detail control.

Areas for future work include: a more rigorous scheme for constructing the domain surface, improved filtering of bump maps, hardware rendering, error measures for view-dependent adaptive tessellation, and use of detail textures for displacements.

Compared to the meshes of the prior art, the foregoing representation offers a number of advantages including:

(1) the patch structure of the domain surface being defined by a control mesh whose connectivity is much simpler than that of the original detailed mesh;

(2) fine detail in the displacement field being captured as a scalar-valued function which is more compact than traditional vector-valued geometry;

(3) the parameterization of the displaced surface being inherited from the smooth domain surface and therefore not needing to be stored explicitly;

(4) the displacement field being used to easily generate bump maps, obviating their storage;

(5) the ability of level of detail (LOD) rendering a surface with a wide range of numbers of triangles based on the particular situation; and (6) the ability to manipulate a very large amount of geometry using very few control points, or base mesh vertices (i.e. animation).

While various embodiments have been described above, it should be understood that they have been presented by way of example only; and not limitation. Thus, the breadth and scope of a preferred embodiment should not be limited by any of the above described exemplary embodiments, but should be defined only in accordance with the following claims and their equivalents.

What is claimed is:

1. A system for displacement mapping, comprising:
   (a) a coarse first mesh; and
   (b) a fine second mesh with a topology substantially similar to a topology of the first mesh, wherein the second mesh is generated by simplifying the first mesh using edge collapse transformations with added heuristics to preserve a scalar offset function;
   wherein the second mesh includes a plurality of scalar values which each represent an offset between various points on the first mesh and the second mesh;
   wherein each offset is in a normal direction with respect to the second mesh.

2. The system as recited in claim 1, wherein the first mesh and the second mesh are generated using the same subdivision process.

3. The system as recited in claim 1, wherein the first mesh and the second mesh are generated using the same subdivision process upon evaluating a surface beyond a resolution of the second mesh.

4. The system as recited in claim 1, wherein the system facilitates compression schemes.

5. The system as recited in claim 1, wherein the system facilitates animation.

6. The system as recited in claim 1, wherein the system facilitates adaptive tessellation.

7. The system as recited in claim 1, wherein the system facilitates back face culling.

8. The system as recited in claim 1, wherein the system facilitates network transmission.

9. A method for displacement mapping, comprising:
   (a) providing a representation including:
      a coarse first mesh, and
      a fine second mesh with a topology substantially similar to a topology of the first mesh, wherein the second mesh includes a plurality of scalar values which each represent an offset between various points on the first mesh and the second mesh, and the second mesh is generated by simplifying the first mesh using edge collapse transformations with added heuristics to preserve a scalar offset function; and
   (b) performing a rendering operation utilizing the representation;
   wherein each offset is in a normal direction with respect to the second mesh.

10. A data structure stored in memory for displacement mapping, comprising:
    a representation object including:
      a coarse first mesh, and
      a fine second mesh with a topology substantially similar to a topology of the first mesh, wherein the second mesh includes a plurality of scalar values which each represent an offset between various points on the first mesh and the second mesh, and the second mesh is generated by simplifying the first mesh using edge collapse transformations with added heuristics to preserve a scalar offset function;
    wherein each offset is in a normal direction with respect to the second mesh.

11. A system for displacement mapping, comprising:
    (a) means for providing a representation including:
       a coarse first mesh, and
       a fine second mesh with a topology substantially similar to a topology of the first mesh, wherein the second mesh includes a plurality of scalar values which each represent an offset between various points on the first mesh and the second mesh, and the second mesh is generated by simplifying the first mesh using edge collapse transformations with added heuristics to preserve a scalar offset function; and
    (b) means for performing a rendering operation utilizing the representation;
    wherein each offset is in a normal direction with respect to the second mesh.

12. A system for displacement mapping, comprising:
    (a) a coarse first mesh means; and
    (b) a fine second mesh means with a topology substantially similar to a topology of the first mesh means;
       wherein the second mesh means includes a plurality of scalar values which each represent an offset between various points on the first mesh means and the second mesh means, and the fine second mesh means is generated by simplifying the first mesh means using edge collapse transformations with added heuristics to preserve a scalar offset function;
       wherein each offset is in a normal direction with respect to the second mesh means.

13. A method for displacement mapping to convert an arbitrary triangle mesh into a displaced subdivision surface, comprising:
    (a) obtaining an original coarse first mesh;
    (b) simplifying the original coarse first mesh for generating a fine second mesh, wherein the simplifying uses edge collapse transformations with added heuristics to preserve a scalar offset function;
    (c) optimizing the fine second mesh such that a domain surface fits the original coarse first mesh; and
    (d) generating intersections between normals formed on the domain surface and the original coarse first mesh for sampling purposes;

(e) wherein a resulting displacement map is sampled by shooting rays along the normals formed on the domain surface until the rays intersect the original coarse first mesh;
(f) wherein a signed displacement is computed at ray intersection points;
(g) wherein appearance attributes including surface color are sampled at the ray intersection points;
(h) wherein the fine second mesh has a topology substantially similar to a topology of the original coarse first mesh, wherein the fine second mesh includes a plurality of scalar values which each represent an offset between various points on the original coarse first mesh arid the fine second mesh;
(i) wherein each offset is in a normal direction with respect to the fine second mesh;
(j) wherein the original coarse first mesh and the fine second mesh are generated using the same subdivision process upon evaluating a surface beyond a resolution of the fine second mesh;
(k) wherein the system facilitates compression schemes, animation, adaptive tessellation, back face culling, and network transmission.

* * * * *

UNITED STATES PATENT AND TRADEMARK OFFICE
CERTIFICATE OF CORRECTION

PATENT NO. : 6,738,062 B1  Page 1 of 1
APPLICATION NO. : 09/839422
DATED : May 18, 2004
INVENTOR(S) : Moreton It is certified that error appears in the above-identified patent and that said Letters Patent is hereby corrected as shown below:

col. 18, line 1 replace "arid" with --and--.

Signed and Sealed this

Sixteenth Day of February, 2010

David J. Kappos
*Director of the United States Patent and Trademark Office*